United States Patent
Jang et al.

(10) Patent No.: US 9,497,672 B2
(45) Date of Patent: Nov. 15, 2016

(54) METHOD FOR PERFORMING HANDOVER IN WIRELESS ACCESS SYSTEM FOR SUPPORTING COMMUNICATION BETWEEN DEVICES AND APPARATUS FOR SUPPORTING SAME

(75) Inventors: Jiwoong Jang, Anyang-si (KR); Hangyu Cho, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 348 days.

(21) Appl. No.: 14/116,427

(22) PCT Filed: May 15, 2012

(86) PCT No.: PCT/KR2012/003800
§ 371 (c)(1),
(2), (4) Date: Nov. 8, 2013

(87) PCT Pub. No.: WO2012/157941
PCT Pub. Date: Nov. 22, 2012

(65) Prior Publication Data
US 2014/0071950 A1    Mar. 13, 2014

Related U.S. Application Data

(60) Provisional application No. 61/486,738, filed on May 16, 2011.

(51) Int. Cl.
| | | |
|---|---|---|
| *H04W 36/00* | (2009.01) | |
| *H04W 76/04* | (2009.01) | |
| *H04W 76/02* | (2009.01) | |
| *H04W 36/30* | (2009.01) | |
| *H04W 88/06* | (2009.01) | |

(52) U.S. Cl.
CPC ......... *H04W 36/0072* (2013.01); *H04W 36/30* (2013.01); *H04W 76/023* (2013.01); *H04W 76/043* (2013.01); *H04W 36/0055* (2013.01); *H04W 88/06* (2013.01)

(58) Field of Classification Search
CPC ............. H04W 36/30; H04W 76/023; H04W 36/0072; H04W 76/043; H04W 36/0055; H04W 88/06
See application file for complete search history.

(56) References Cited

U.S. PATENT DOCUMENTS

2005/0232212 A1* 10/2005 Kang ................ H04W 36/0061
370/338
2006/0014539 A1   1/2006  Oh
(Continued)

FOREIGN PATENT DOCUMENTS

KR   10-2006-0005115 A    1/2006
KR   10-2009-0005601 A    1/2009
(Continued)

OTHER PUBLICATIONS

Huh et al., "Best Path Selection Mechanism," IEEE 802.11-07/xxxxr00, XP017684128, May 14, 2007, slides 1-7.
(Continued)

*Primary Examiner* — Redentor Pasia
(74) *Attorney, Agent, or Firm* — Birch, Stewart, Kolasch & Birch, LLP (57) ABSTRACT

The present invention provides a ceaseless communication method between devices in a wireless access system for supporting communication between the devices, a method for switching the communication to a cellular network, and an apparatus for supporting the same. A method for performing a handover to the cellular network in the wireless access system for supporting the direct communication between the devices according to one embodiment of the present invention, includes the steps of: detecting the generation of a handover condition to the cellular network in a first device for performing the direction communication between the devices; transmitting a message for requesting a bandwidth for the cellular network to a base station; receiving a bandwidth response message including the bandwidth allocation information for the bandwidth allocated to the first device as a response to a bandwidth request from the base station; and enabling the first device to transmit data through the base station and the cellular network on the basis of the bandwidth allocation information for the bandwidth.

16 Claims, 8 Drawing Sheets

(56) References Cited

U.S. PATENT DOCUMENTS

| | | | |
|---|---|---|---|
| 2007/0207810 A1* | 9/2007 | Cho | H04L 1/0026 455/450 |
| 2009/0016232 A1 | 1/2009 | Kwon et al. | |
| 2009/0156224 A1 | 6/2009 | Matsumaru | |
| 2010/0254337 A1* | 10/2010 | Lin | H04W 28/06 370/329 |
| 2010/0261469 A1 | 10/2010 | Ribeiro et al. | |
| 2012/0269169 A1 | 10/2012 | Jung et al. | |
| 2013/0102314 A1* | 4/2013 | Koskela | H04W 36/0072 455/436 |

FOREIGN PATENT DOCUMENTS

| | | |
|---|---|---|
| KR | 10-2010-0081909 A | 7/2010 |
| WO | WO 2004/077920 A2 | 9/2004 |
| WO | WO 2004/103008 A1 | 11/2004 |
| WO | WO 2009/008662 A2 | 1/2009 |

OTHER PUBLICATIONS

Doppler et al., "Device-to-Device Communication as an Underlay to LTE-Advanced Networks," Topics in Radio Communications, IEEE Communications Magazine, Dec. 2009, pp. 42-49.

* cited by examiner

METHOD FOR PERFORMING HANDOVER IN WIRELESS ACCESS SYSTEM FOR SUPPORTING COMMUNICATION BETWEEN DEVICES AND APPARATUS FOR SUPPORTING SAME

CROSS REFERENCE TO RELATED APPLICATIONS

This non-provisional application is a National Stage entry under U.S.C. §371 of International Application No. PCT/KR2012/003800 filed on May 15, 2012, which claims the benefit of U.S. Provisional Application No. 61/486,738 filed on May 16, 2011. The entire contents of all of the above applications are hereby incorporated by reference.

TECHNICAL FIELD

The present invention relates to wireless access system supporting between communication between devices, and more particularly, to a method for performing seamless communication between devices, a method for switching the communication to a cellular network, and an apparatus for supporting the same.

BACKGROUND ART

Hereinafter, a device to device communication environment will be described.

Device to device (D2D) communication refers to communication between an electronic device and another electronic device. In a broad sense, D2D communication refers to wire or wireless communication between electronic devices or communication between a machine and a device controlled by a person. However, it is general that D2D communication recently refers to wireless communication between electronic devices, i.e., devices performed without control of a person.

In the early 1990s when D2D communication has been introduced, D2D communication has been recognized as remote control or telematics and D2D communication markets have been very restrictive. However, D2D communication markets have received attention all over the world since D2D communication had been able to grow rapidly for last several years. Particularly, D2D communication has exerted its great influence at point of sales (POS) and security related application markets in the fields of fleet management, remote monitoring of machine and facilities, measurement of working time on construction machine facilities, and smart meter automatically measuring heat or the use of electricity. It is expected that D2D communication will be used for various purpose of uses in association with the existing mobile communication and low power communication solutions such as wireless high-speed Internet, Wi-Fi, and Zigbee and that its coverage will be extended to business to consumer (B2C) markets without limitation to business to business (B2B) markets.

In the D2D communication age, since all machines provided with a subscriber identity module (SIM) card may be able to perform data transmission and reception, they may remotely be controlled. For example, D2D communication technologies may be used for many machines and equipments such as cars, trucks, trains, containers, vending machines, and gas tanks. In this way, application ranges of D2D communication technologies are very broad.

According to the related art, since it was general that a user equipment was controlled separately, communication between a base station and a user equipment has been performed by a one-to-one communication mode. Supposing that many D2D devices perform communication with a base station through such a one-to-one communication mode, network overload will be caused by signaling generated between each of the D2D devices and the base station. As described above, if D2D communication is rapidly spread and widely used, a problem may occur due to overhead caused by communication between D2D devices or between each of the D2D devices and the base station.

Also, according to the related art, although studies for D2D direct communication have been made, studies for a method for performing seamless communication if a status of D2D connection is not good or switching (that is, handover or routing) of a communication mode between D2D and cellular network in D2D communication have been insufficient.

DISCLOSURE

Technical Problem

An object of the present invention devised to solve the conventional problem is to provide a method for performing efficient communication between D2D devices.

Another object of the present invention is to provide a method for transmitting seamless data in D2D direct communication even if link quality between D2D devices is deteriorated.

Other object of the present invention is to provide a handover method between cellular communications in D2D direct communication if link quality between D2D devices is deteriorated.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for performing seamless communication between devices in a wireless access system that supports D2D communication, a method for switching the communication to a cellular network, and apparatuses for supporting the same will be provided.

In one aspect of the present invention, a method for performing a handover to a cellular network in a wireless access system for supporting device to device (D2D) direct communication comprises the steps of: detecting that a handover condition to the cellular network in a first device for performing the D2D direction communication; transmitting a message for requesting a bandwidth for the cellular network to a base station; receiving a bandwidth response message including bandwidth allocation information on the bandwidth allocated to the first device in response to the bandwidth request from the base station; and allowing the first device to transmit data through the base station and the cellular network on the basis of the bandwidth allocation information on the bandwidth.

The method may further comprise the steps of receiving a channel quality information request message for requesting channel quality information from the base station; and transmitting a channel quality information response message, which includes the channel quality information, to the base station.

The method may further comprise the step of transmitting a message, which indicates that the D2D direct communication has ended, to the base station and the second device which is performing the D2D direct communication.

The method may further comprise the step of receiving a message, which indicates that the D2D direct communication has ended, from the base station.

In another aspect of the present invention, a method for supporting a handover to a cellular network in a wireless access system for supporting device to device (D2D) direct communication comprises the steps of: receiving a request message of a bandwidth for the cellular network from a first device, which detects that a handover condition to the cellular network has occurred and performs the D2D direct communication; allocating a bandwidth to the first device and a second device, which performs the D2D direct communication, in response to the bandwidth request; transmitting a bandwidth response message, which includes bandwidth allocation information on the allocated bandwidth, to the first device and the second device; and receiving data from the first device and the second device through the cellular network on the basis of the bandwidth allocation information on the bandwidth.

The method for supporting a handover may further comprise the steps of receiving a channel quality information request message for requesting channel quality information from the base station; and transmitting a channel quality information response message, which includes the channel quality information, to the base station.

The method for supporting a handover may further comprise the step of transmitting a message, which indicates that the D2D direct communication has ended, to the base station and the second device which is performing the D2D direct communication.

The method for supporting a handover may further comprise the step of receiving a message, which indicates that the D2D direct communication has ended, from the base station.

In still another aspect of the present invention, a device for performing a handover to a cellular network in a wireless access system for supporting device to device (D2D) direct communication comprises a radio frequency (RF) module configured to include a transmitter and a receiver; and a processor configured to support the handover.

In this case, the device detects that a handover condition to the cellular network in a first device for performing the D2D direction communication, transmits a message for requesting a bandwidth for the cellular network to a base station, receives a bandwidth response message including bandwidth allocation information on the bandwidth allocated to the first device in response to the bandwidth request from the base station, and transmits data by using the RF module through the base station and the cellular network on the basis of the bandwidth allocation information on the bandwidth.

At this time, the device may receive a channel quality information request message for requesting channel quality information from the base station and transmit a channel quality information response message, which includes the channel quality information, to the base station.

Also, the device may transmit a message, which indicates that the D2D direct communication has ended, to the base station and the second device which is performing the D2D direct communication.

Also, the device may receive a message, which indicates that the D2D direct communication has ended, from the base station.

In the above aspects of the present invention, the handover condition includes one or more of reception of continuous NACK signal of two times or more, occurrence of continuous time-out, a case where a channel status of a channel for the D2D direct communication, a case where one of devices, which are performing the D2D direct communication, moves to another cell, a case where a transmission power of one of devices, which are performing the D2D direct communication, is more than a threshold value, a case where a distance between devices, which are performing the D2D direct communication, is more than a predetermined distance, a case where a modulation and coding scheme (MCS) level of one of devices, which are performing the D2D direct communication, is less than a threshold value, a case where channel quality of each of devices, which are performing the D2D direct communication, is less than a threshold value, and a case where radio resources to be allocated to devices, which are performing the D2D direct communication, are not sufficient.

The above aspects of the present invention are only a part of the embodiments of the present invention, and various embodiments based on technical features of the present invention may be devised and understood by the person with ordinary skill in the art based on the detailed description of the present invention.

Advantageous Effects

According to the embodiments of the present invention, the following advantages may be obtained.

First of all, the D2D devices may perform communication efficiently by adaptively performing handover between D2D communication and cellular communication.

Second, in D2D direct communication, the D2D devices may transmit and receive seamless data even if link quality between D2D devices is deteriorated.

Finally, in D2D direct communication, D2D devices may transmit and receive seamless data by performing handover (or routing) to cellular communication if link quality between D2D devices is deteriorated.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The embodiments of the present invention provide a method for performing seamless communication between devices in a wireless access system that supports D2D communication, a method for switching the communication to a cellular network, and apparatuses for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will not be disclosed. Also, procedures or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP).

Also, in the present invention, D2D device means a user equipment that performs communication between devices, and may simply be referred to as a device. Also, the D2D device may be replaced with terms such as a user equipment (UE), a mobile station (MS), a subscriber station (SS), a mobile subscriber station (MSS), a mobile terminal, a terminal, a device, or a machine to machine (M2M) device.

Furthermore, a transmitting side means a fixed or mobile node that transmits data services or voice services while a receiving side means a fixed or mobile node that receives data services or voice services. Accordingly, in an uplink, the mobile station could be the transmitting side while the base station could be the receiving side. Likewise, in a downlink, the mobile station could be the receiving side while the base station could be the transmitting side.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, steps or parts which are not described to clarify the technical features of the present invention may be supported by the above standard documents.

Also, all terminologies disclosed herein may be described by the above standard documents. Particularly, the embodiments of the present invention may be supported by one or more of the 3GPP LTE/LTE-A standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

The embodiments of the present invention will be described in detail with reference to the accompanying drawings to be easily carried out by the person with ordinary skill in the art to which the present invention pertains. However, it is to be understood that the present invention may be implemented by various modifications and is not limited to the embodiments which will be described herein. In the drawings, parts which are not related with the description of the present invention will be omitted to clarify the present invention. Wherever possible, the same reference numbers will be used throughout the drawings to refer to the same or like parts.

In this specification, when some part "includes" some elements, it means that the part may further include other elements unless mentioned to the contrary. Also, terminologies " . . . part," " . . . block," and " . . . module" mentioned in this specification mean a unit processing at least one function or operation, and may be implemented by hardware, software or combination of hardware and software.

Also, specific terminologies hereinafter used in the embodiments of the present invention are provided to assist understanding of the present invention, and various modifications may be made in the specific terminologies within the range that they do not depart from technical spirits of the present invention.

For example, in the embodiments of the present invention, a multicast traffic indication (MTI) field may be used to refer to a multicast paging message indication field, and a reliable traffic indication (RTI) field may be used to refer to a reliable paging message indication field. Also, the terminology 'traffic' may be used to refer to the terminology 'data.

1. General D2D Communication

In the embodiments of the present invention, communication between D2D devices means a communication type performed between (1) user equipments through a base station (e.g, controlled D2D) and between (2) a base station and user equipments without control of a user, or between (3) a communication type between D2D devices (e.g., uncontrolled D2D). Accordingly, the D2D device means a user equipment that can support communication between the D2D devices.

An access service network for D2D service will be defined as an D2D access service network (ASN), and a network entity that performs communication with D2D devices will be referred to as D2D server. The D2D server performs D2D application, and provides D2D specific service for one or more D2D devices. D2D feature is a feature of D2D application, and one or more features may be required to provide application. D2D device group means a group of D2D devices that share one or more features.

Devices (that may be referred to as various terms such as D2D device, D2D communication device, and machine type communication (MTC) device) that perform communication in D2D mode will be increased gradually in a certain network as their device application types are increased.

Examples of device application types include (1) security, (2) public safety, (3) tracking and tracing, (4) payment, (5) healthcare, (6) remote maintenance and control, (7) metering, (8) consumer device, (9) fleet management at POS (Point Of Sales) and security related application market, (10) communication between devices of vending machines, (11) remote controlling of machine and facilities, measurement of working time on construction machine facilities, and smart meter automatically measuring heat or the use of electricity, and (12) surveillance video communication of a surveillance camera. However, the device application types are not limited to the above examples, and the other various device application types may be used.

Another feature of the D2D device is low mobility or has no mobility once the D2D device is installed. That is, low mobility or no mobility means that the D2D device is stationary for a long time. The D2D communication system may simplify or optimize mobility-associated operations for a specific D2D application having a fixed location such as secured access and surveillance, public safety, payment, remote maintenance and control, and metering.

Figure 1:
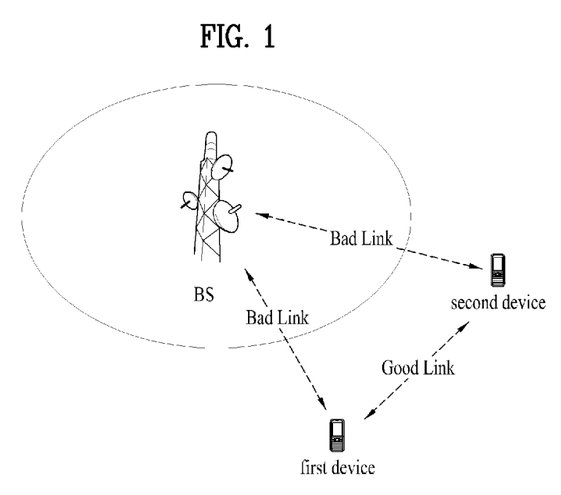
FIG. 1 is a diagram illustrating one of direct communication methods between D2D devices.

FIG. 1 is a diagram illustrating one of direct communication methods between D2D devices.

D2D direct communication is performed between D2D devices, which are located at a short distance from each other or has good channel statuses, by a direct link to save the power and resources as compared with communication through a base station. In particular, in case of D2D devices (for example, the first device and the second device) located at a short distance at the cell edge as illustrated in FIG. 1, the resources and power saving advantage due to D2D direct communication is very great.

For example, if the base station and the D2D device are respectively connected to a link (that is, controlled D2D status), since the D2D device should reserve uplink and downlink resources, in case of two D2D devices, a total of four radio resources are reserved by the D2D devices. However, in case of D2D direct communication, since a link between the D2D devices is only connected, two radio resources are reserved by the D2D devices. Accordingly, D2D direct communication has the greater resources and power saving advantage than that of communication through a cellular network. Also, although FIG. 1 illustrates that two D2D devices perform D2D direct communication, more than two D2D devices may perform D2D direct communication.

2. General D2D Device

Figure 2:
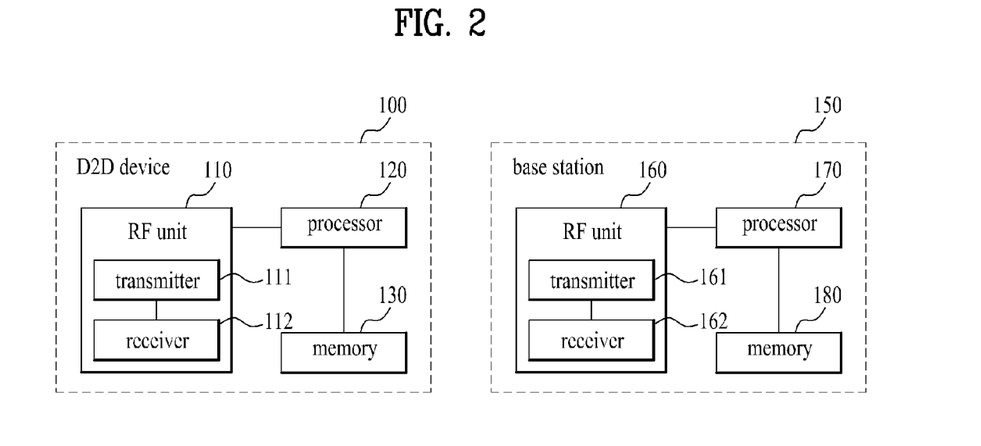
FIG. 2 is a brief diagram illustrating configurations of a D2D device and a base station in accordance with one embodiment of the present invention.

FIG. 2 is a brief diagram illustrating configurations of a D2D device and a base station in accordance with one embodiment of the present invention.

In FIG. 2, each of a D2D device 100 and a base station 150 may include a radio frequency (RF) unit 110, 160, and a processor 120, 170. Each of the D2D device and the base station may selectively include a memory 130, 180. Although FIG. 2 illustrates one D2D device and one base station, a D2D communication environment may be configured among a plurality of D2D devices and base stations.

Each RF unit 110, 160 may include a transmitter 111, 161 and a receiver 112, 162. In case of the D2D device 100, the transmitter 111 and the receiver 112 may be configured to transmit and receive a signal to and from the base station 150 and other D2D devices, and the processor 120 may be functionally connected with the transmitter 111 and the receiver 112 to control the signal transmission and reception procedure of the transmitter 111 and the receiver 112 to and from other devices. Also, the processor 120 performs various kinds of processing for a signal for transmission and then transmits the processed signal to the transmitter 111, and may perform processing for the signal received by the receiver 112.

The processor 120 may store information included in the exchanged message in the memory 130 if necessary. The D2D device 100 configured as above may perform methods of various embodiments which will be described later.

In the meantime, although not shown in FIG. 2, the D2D device 100 may include various additional elements in accordance with its device application type. For example, if the corresponding D2D device 100 is for smart metering, it may include additional element for power measurement. An operation for power measurement may be controlled by the processor 120 shown in FIG. 2, or may be controlled by a separate processor (not shown).

Although FIG. 2 illustrates an example of communication performed between the D2D device 100 and the base station 150, a method for D2D communication according to the present invention may be performed between one or more D2D devices, each of which may perform the method according to various embodiments, which will be described later, in the same manner as each device shown in FIG. 2.

In case of the base station 150, the transmitter 161 and the receiver 162 may be configured to transmit and receive a signal to and from another base station, D2D server and D2D devices, and the processor 170 may be functionally connected with the transmitter 161 and the receiver 162 to control the signal transmission and reception procedure of the transmitter 161 and the receiver 162 to and from other devices. Also, the processor 170 performs various kinds of processing for a signal for transmission and then transmits the processed signal to the transmitter 161, and may perform processing for the signal received by the receiver 162. The processor 170 may store information included in the exchanged message in the memory 180 if necessary. The base station 150 configured as above may perform methods of various embodiments which will be described later.

Each processor 120, 170 of the D2D device 110 and the base station 150 commands (for example, controls, coordinates or manages) the operation of each of the D2D device 110 and the base station 150. Each processor 120, 170 may be connected with the memory 130, 180 that stores program codes and data therein. The memory 130, 180 is connected with the processor 120, 170 and stores an operating system, an application, and general files therein.

The processor 120, 170 may be referred to as a controller, a microcontroller, a microprocessor, or a microcomputer. In the meantime, the processor 120, 170 may be implemented by hardware, firmware, software, or their combination. If the embodiments of the present invention are implemented by hardware, the processor 120, 170 may include application specific integrated circuits (ASICs), digital signal processors (DSPs), digital signal processing devices (DSPDs), programmable logic devices (PLDs), and field programmable gate arrays (FPGAs).

In the mean time, if the embodiments of the present invention are implemented by firmware or software, the firmware or software may be configured to include a module, a procedure, or a function, which performs functions or operations of the present invention. The firmware or software may be provided in the processor 120, 170 or may be stored in the memory 130, 180 and then may be driven by the processor 120, 170.

3. Method for Performing Handover

If gain of the power or resources due to D2D direct communication disappears as channel quality between D2D devices is deteriorated during D2D direct communication (see FIG. 1), there is no reason for maintaining D2D direct communication.

Also, even though a link of D2D direct communication is disconnected due to deterioration of the link, seamless data transmission between D2D devices should be maintained. Accordingly, a method for switching data transmission to a cellular network will be required in a state that gain of D2D direct communication disappears or a link of D2D direct communication is disconnected.

As far as there are no separate restrictions, suggestions which will be described later may be applied to controlled D2D communication where a base station (BS) or central devices of the existing cellular network control resource allocation and uncontrolled D2D communication which is uncontrolled by the existing cellular network. However, if it is described that the suggestion is limited to controlled D2D communication or uncontrolled D2D communication, it is assumed that the suggestion is applied to the corresponding communication only.

Hereinafter, the status that a handover condition occurs during D2D communication will be described. In other words, a condition for allowing a D2D device, which performs D2D direct communication, to switch a communication mode to a cellular network will be described.

(1) Handover Condition to Cellular Network

1) If a NACK signal is generated continuously during a communication procedure between the D2D devices, the D2D device may switch a data transmission mode from D2D direct communication to a cellular network.

The continuous NACK signal is sufficient to determine that the channel status is not suitable for data transmission. In this case, in order to improve channel quality, the D2D device should increase the transmission power or use additional radio resources. However, this action removes gain of D2D direct communication.

Accordingly, if the NACK signal is generated continuously, it is preferable that the D2D device switches the communication mode from the D2D direct communication to the cellular network. At this time, it is preferable that the number of continuous NACK times for switching to the cellular network is two times or three times.

2) If continuous time-out occurs, the D2D device may switch the data transmission mode from the D2D direct communication to the cellular network.

Time-out is the status that the D2D device or the other party does not recognize whether data has been received. For example, time-out is the status that there is no response to transmission of a control message. In other words, it may be determined that channel quality of the status that time-out occurs is not better than that of the status that the NACK signal is generated continuously.

In this case, in order to improve channel quality, the D2D device should increase the transmission power or use additional radio resources as described above. However, this action removes gain of D2D direct communication. Accordingly, if time-out occurs continuously, it is preferable that the D2D device switches the communication mode from the D2D direct communication to the cellular network. At this time, the number of continuous time-out times for switching to the cellular network may be one time, two times or three times.

3) The D2D device switches the data transmission mode from the D2D direct communication to the cellular network if a frame error rate or bit error rate, which is measured through the received data, is less than a reference value.

4) If one or more of D2D devices, which perform D2D direct communication, move to another cell, the D2D devices may switch the data transmission mode from the D2D direct communication to the cellular network.

If the D2D devices, which perform D2D direct communication, are located at their respective cells different from one another, each of the D2D devices should use resources corresponding to the uplink (UL) and the downlink (DL) at its cell. In particular, since the D2D devices should use the same resources to maintain D2D direct communication, limitation in use of the resources is increased, whereby efficiency of resources, which is the advantage of D2D direct communication, is reduced.

Accordingly, if one or more D2D devices move to their respective cells different from one another during D2D direct communication, the D2D devices may switch the communication mode from the D2D direct communication to the cellular network.

However, if the two D2D devices move to the same cell at the same time or at a very short time interval, the D2D devices may continue to perform D2D direct communication by receiving resources for the D2D direct communication from the moved cell without switching the communication mode to the cellular network.

5) If the transmission power of one or more of the D2D devices, which perform D2D direct communication, is increased to be more than a given threshold value, the D2D devices may switch the communication mode to the cellular network.

At this time, the threshold value may be the value, which may obtain transmission power gain through D2D direct communication as compared with the cellular network mode, or may be the value obtained by adding or subtracting an offset value to or from the value, which may obtain transmission power gain.

6) If a modulation & coding scheme (MCS) level of one or more of the D2D devices, which perform D2D direct communication, is reduced to be less than a given value, the D2D devices may switch the communication mode to the cellular network.

7) If distance between the D2D devices, which perform D2D direct communication, is increased to be more than a given value, the D2D devices may switch the communication mode to the cellular network.

In this case, the D2D device may not switch the communication mode but the base station may command the D2D device to switch the communication mode. At this time, the distance of the threshold value may be a cell radius or half of the cell radius.

8) If channel quality measured through a pilot or reference signal is reduced to be less than a given level, the D2D devices may switch the communication mode to the cellular network.

9) The D2D devices may use the communication mode that provides a link having better channel quality.

For example, in case of the controlled D2D communication mode, the D2D devices may estimate channel quality by periodically receiving the pilot or reference signal from the base station or a network entity equivalent to the base station. In this case, the D2D devices may compare channel quality of a D2D link between the D2D devices with channel quality between the base station and the D2D device, and may switch the communication mode to the cellular network if the latter channel quality is better than the former channel quality.

10) If radio resources to be allocated to the D2D devices, which perform D2D direct communication, are not sufficient, the D2D devices may switch the communication mode from the D2D direct communication to the cellular network.

For example, in case of the controlled D2D communication, radio resources may not be allocated to the D2D devices any more under a specific status. At this time, the base station (BS) may control the D2D devices to switch the communication mode from the D2D direct communication to the cellular network if resources to be allocated to the D2D devices are not sufficient.

11) If two or more of the aforementioned 1) to 10) occur, the base station and/or the D2D devices may switch the communication mode from the D2D direct communication to the cellular network.

Under the aforementioned conditions, the D2D devices may switch the communication mode from the D2D direct communication to the cellular network. This may be regarded as handover or routing. Hereinafter, if the aforementioned conditions occur, various methods for performing handover from the D2D direct communication to the cellular network will be described.

(2) Method for Performing Handover to Cellular Network of D2D Device

Methods for switching a communication mode from D2D direct communication to a cellular network will be described as the embodiments of the present invention. Any one of the D2D devices may sense the handover condition from the D2D direct communication to the cellular network. However, in the following embodiments, it is assumed that sensing and recognition of the handover condition to the cellular network is performed by the D2D device 1 (that is, the first D2D device). Also, in the following embodiments, the D2D device may simply be referred to as 'device'.

Figure 3:
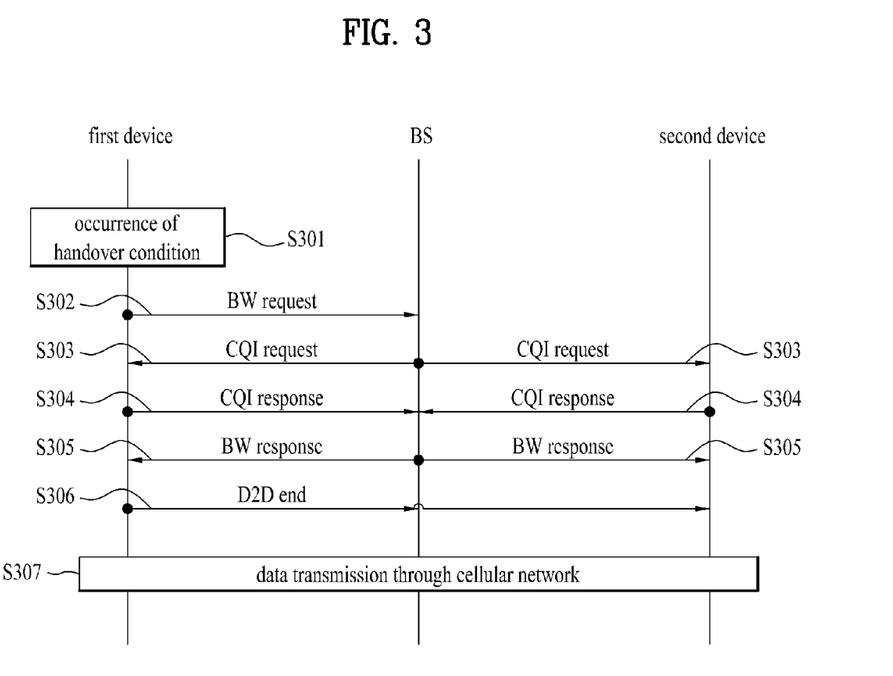
FIG. 3 is a diagram illustrating a method for handover to a cellular network in accordance with one embodiment of the present invention.

FIG. 3 is a diagram illustrating a method for handover to a cellular network in accordance with one embodiment of the present invention.

Referring to FIG. 3, the first device (Device 1) recognizes the aforementioned handover condition to the cellular network (S301).

Afterwards, the first device transmits a bandwidth (BW) request message for bandwidth request to the base station (BS) (S302).

The base station BS that has received the BW request message transmits a channel quality information (CQI) request message, which requests CQI on radio resources (for example, channel, link, etc.) allocated for the D2D direct communication, to the first device and the second device, which perform the D2D direct communication (S303).

The first device and the second device, which have received the CQI request message, measures CQI on the radio resources for the D2D direct communication and transmits a CQI response message, which includes the CQI, to the base station (S304).

The base station that has received the CQI response message allocates a proper bandwidth to the first device and the second device on the basis of the CQI included in the CQI response message, and transmits a bandwidth (BW) response message, which includes information on the allocated bandwidth, to the first device and the second device (S305).

Afterwards, the first device transmits a message, which indicates that the existing D2D direct communication has ended, to the base station and the second device, respectively. At this time, after receiving the message indicating that the D2D direct communication has ended, the base station releases the radio resources allocated to each D2D device (S306).

Also, the first device and the second device may transmit and receive data to and from the base station and the cellular network through the bandwidth (BW) allocated from the base station (S307).

Through the aforementioned steps, the D2D devices may perform handover (or routing) from the D2D direct communication to the cellular network. Accordingly, the D2D device may transmit and receive data through the base station without seamlessness even after handover of the data, which are transmitted and received for the D2D direct communication, to the cellular network is performed.

Figure 4:
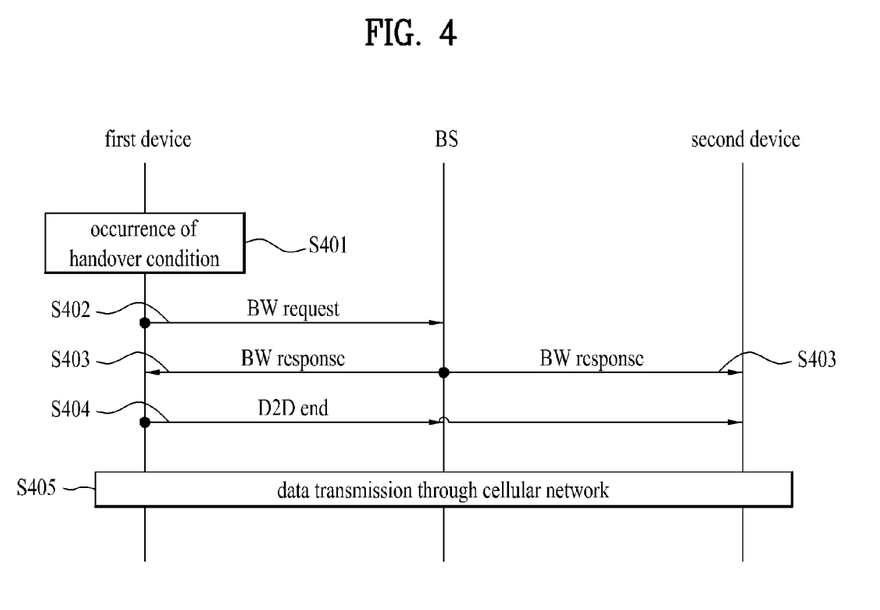
FIG. 4 is a diagram illustrating another method for handover to a cellular network in accordance with one embodiment of the present invention.

FIG. 4 is a diagram illustrating another method for handover to a cellular network in accordance with one embodiment of the present invention.

Generally, the base station allocates radio resources within a cell to each user equipment and controls the radio resources. In other words, in the controlled D2D communication environment, it is assumed that the base station already recognizes a resource status within its cell. In this case, the steps S303 and S304 of FIG. 3 may be meaningless. Accordingly, the base station may not perform request and response of the CQI to each D2D device.

Referring to FIG. 4, the first device (Device 1) recognizes the aforementioned handover condition to the cellular network (S401).

Afterwards, the first device transmits a bandwidth (BW) request message for bandwidth request to the base station (BS) (S402).

The base station allocates a proper bandwidth to the first device and the second device on the basis of the CQI on the D2D devices, and transmits a bandwidth (BW) response message, which includes information on the allocated bandwidth, to the first device and the second device (S403).

Afterwards, the first device transmits a message, which indicates that the existing D2D direct communication has ended, to the base station and the second device, respectively. At this time, after receiving the message indicating that the D2D direct communication has ended, the base station releases the radio resources allocated to each D2D device (S404).

Also, the first device and the second device may transmit and receive data to and from the base station and the cellular network through the bandwidth (BW) allocated from the base station (S405).

Through the aforementioned steps, the D2D devices may perform handover (or routing) from the D2D direct communication to the cellular network. Accordingly, the D2D device may transmit and receive data through the base station without seamlessness even after handover of the data, which are transmitted and received for the D2D direct communication, to the cellular network is performed.

Figure 5:
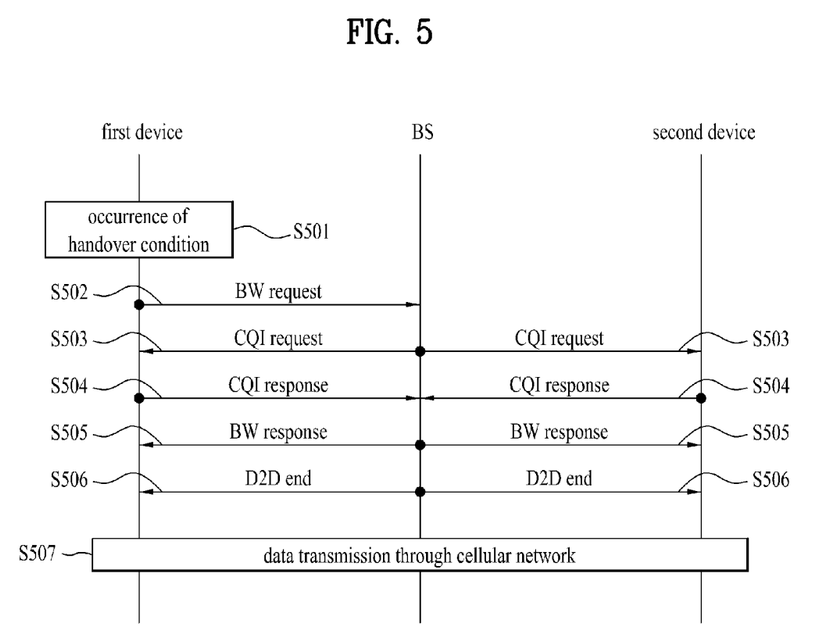
FIG. 5 is a diagram illustrating still another method for handover to a cellular network in accordance with one embodiment of the present invention.

FIG. 5 is a diagram illustrating still another method for handover to a cellular network in accordance with one embodiment of the present invention.

Referring to FIG. 5, the first device (Device 1) recognizes the aforementioned handover condition to the cellular network (S501).

Afterwards, the first device transmits a bandwidth (BW) request message for bandwidth request to the base station (BS) (S502).

The base station BS that has received the BW request message transmits a channel quality information (CQI) request message, which requests CQI on radio resources (for example, channel, link, etc.) allocated for the D2D direct communication, to the first device and the second device, which perform the D2D direct communication (S503).

The first device and the second device, which have received the CQI request message, measures CQI on the radio resources for the D2D direct communication and transmits a CQI response message, which includes the CQI, to the base station (S504).

The base station that has received the CQI response message allocates a proper bandwidth to the first device and the second device on the basis of the CQI included in the CQI response message, and transmits a bandwidth (BW) response message, which includes information on the allocated bandwidth, to the first device and the second device (S505).

However, in FIG. 5, the base station transmits a message, which indicates that the existing D2D direct communication has ended, to the first device and the second device, respectively. At this time, after transmitting the message indicating that the D2D direct communication has ended, the base station releases the radio resources allocated to each D2D device (S506).

Also, the first device and the second device may transmit and receive data to and from the base station and the cellular network through the bandwidth (BW) allocated from the base station (S507).

Through the aforementioned steps, the D2D devices may perform handover (or routing) from the D2D direct communication to the cellular network. Accordingly, the D2D device may transmit and receive data through the base station without seamlessness even after handover of the data, which are transmitted and received for the D2D direct communication, to the cellular network is performed.

Figure 6:
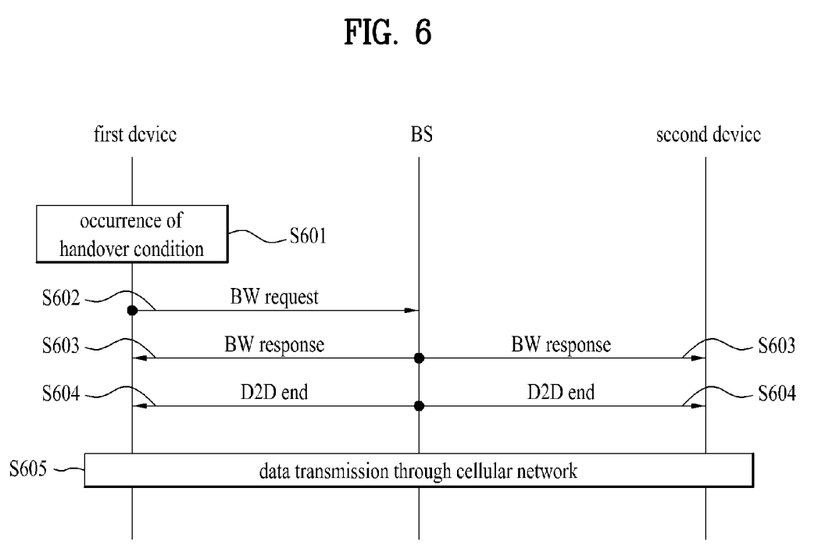
FIG. 6 is a diagram illustrating further still another method for handover to a cellular network in accordance with one embodiment of the present invention.

FIG. 6 is a diagram illustrating further still another method for handover to a cellular network in accordance with one embodiment of the present invention.

Generally, the base station allocates radio resources within a cell to each user equipment and controls the radio resources. In other words, in the controlled D2D communication environment, it is assumed that the base station already recognizes a resource status within its cell. In this case, the steps S503 and S504 of FIG. 5 may be meaningless. Accordingly, the base station may not perform request and response of the CQI to each D2D device.

Referring to FIG. 6, the first device (Device 1) recognizes the aforementioned handover condition to the cellular network (S601).

Afterwards, the first device transmits a bandwidth (BW) request message for bandwidth request to the base station (BS) (S602).

The base station allocates a proper bandwidth to the first device and the second device on the basis of the CQI on the D2D devices, and transmits a bandwidth (BW) response message, which includes information on the allocated bandwidth, to the first device and the second device (S603).

However, in FIG. 6, the base station transmits a message, which indicates that the existing D2D direct communication has ended, to the first device and the second device, respectively. At this time, after transmitting the message indicating that the D2D direct communication has ended, the base station releases the radio resources allocated to each D2D device (S604).

Also, the first device and the second device may transmit and receive data to and from the base station and the cellular network through the bandwidth (BW) allocated from the base station (S605).

Through the aforementioned steps, the D2D devices may perform handover (or routing) from the D2D direct communication to the cellular network. Accordingly, the D2D device may transmit and receive data through the base station without seamlessness even after handover of the data, which are transmitted and received for the D2D direct communication, to the cellular network is performed.

Figure 7:
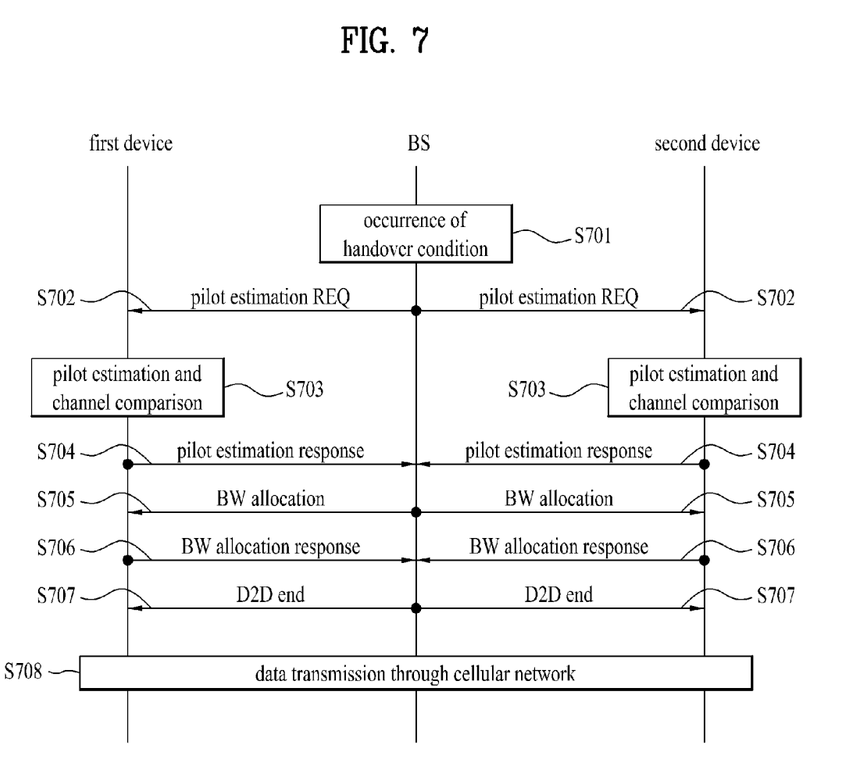
FIG. 7 is a diagram illustrating further still another method for handover to a cellular network in accordance with one embodiment of the present invention.

FIG. 7 is a diagram illustrating further still another method for handover to a cellular network in accordance with one embodiment of the present invention.

Unlike FIGS. 3 to 6, it is assumed in FIG. 7 that the base station recognizes the status that a handover condition to the cellular network occurs (S701).

The base station that has recognized that the handover condition occurred transmits a pilot estimation request message to the first device and the second device, which are performing D2D direct communication, wherein the pilot estimation request message is intended to request the first and second devices to measure the channel status between each device and the base station (S702).

The first device and the second device measure channel quality of the cellular network between the base station and each device by detecting and estimating a pilot signal or reference signal transmitted from the base station. Afterwards, the first device and the second device compare channel quality of a radio channel for D2D direct communication with channel quality between the base station and each device (S703).

Also, the first device and the second device transmit a pilot estimation response message, which includes the compared result of the channel qualities, to the base station (S704).

However, the first device and the second device may measure information only on the channel quality between the base station and each device without comparing the channel qualities with each other at the step S703 and then transmit the measured result to the base station.

The base station may allocate a bandwidth to each D2D device by using the information included in the pilot estimated response message. Also, the base station transmits a BW allocation message, which includes the information on the bandwidth allocated to each device, to the first device and the second device (S705).

The first device and the second device transmit a BW allocation response message to the base station in response to the received BW allocation message (S706).

The base station that has received the BW allocation response message transmits a message, which indicates that the D2D direct communication has ended, to the first device and the second device, respectively. At this time, after transmitting the message indicating that the D2D direct communication has ended, the base station may release the radio resources allocated to each D2D device (S707).

Also, the first device and the second device may transmit and receive data to and from the base station and the cellular network through the bandwidth (BW) allocated from the base station (S708).

Through the aforementioned steps, the D2D devices may perform handover (or routing) from the D2D direct communication to the cellular network. Accordingly, the D2D device may transmit and receive data through the base station without seamlessness even after handover of the data, which are transmitted and received for the D2D direct communication, to the cellular network is performed.

Figure 8:
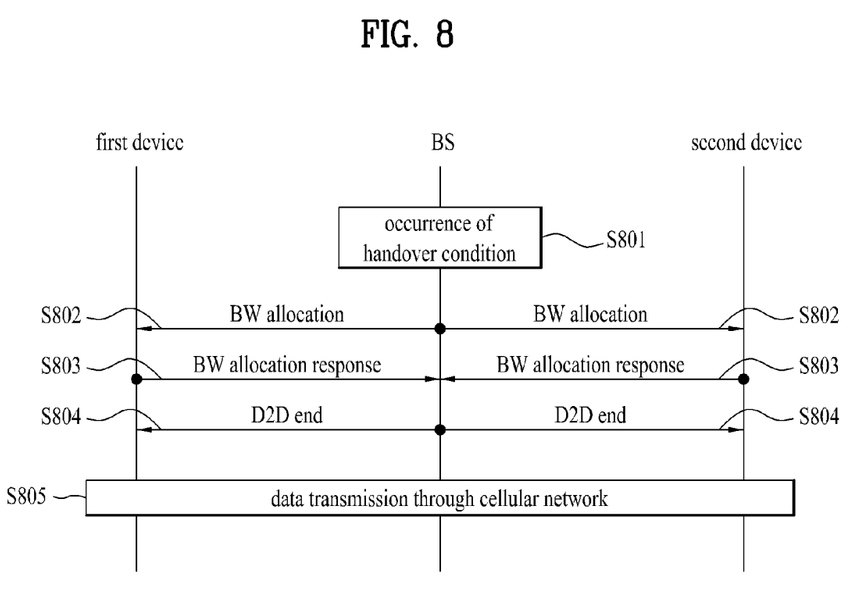
FIG. 8 is a diagram illustrating further still another method for handover to a cellular network in accordance with one embodiment of the present invention.

FIG. 8 is a diagram illustrating further still another method for handover to a cellular network in accordance with one embodiment of the present invention.

Generally, the base station allocates radio resources within a cell to each user equipment and controls the radio resources. In other words, in the controlled D2D communication environment, it is assumed that the base station already recognizes a resource status within its cell. In this case, the steps S702 and S704 of FIG. 7 may be meaningless. Accordingly, the base station may not perform transmission and reception of a pilot estimation request message and a pilot estimation response message to and from each D2D device.

Unlike FIGS. 3 to 6, it is assumed in FIG. 8 that the base station recognizes the status that a handover condition to the cellular network occurs (S801).

The base station that has recognized that the handover condition occurred may allocate a bandwidth for data transmission and reception to the first and second devices, which are performing D2D direct communication. Also, the base station may transmit a BW allocation message, which includes the information on the bandwidth allocated to each device, to the first device and the second device (S802).

The first device and the second device transmit a BW allocation response message to the base station in response to the received BW allocation message (S803).

The base station that has received the BW allocation response message transmits a message, which indicates that the D2D direct communication has ended, to the first device and the second device, respectively. At this time, after transmitting the message indicating that the D2D direct communication has ended, the base station may release the radio resources allocated to each D2D device (S804).

Also, the first device and the second device may transmit and receive data to and from the base station and the cellular network through the bandwidth (BW) allocated from the base station (S805).

Through the aforementioned steps, the D2D devices may perform handover (or routing) from the D2D direct communication to the cellular network. Accordingly, the D2D device may transmit and receive data through the base station without seamlessness even after handover of the data, which are transmitted and received for the D2D direct communication, to the cellular network is performed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention may be applied to various wireless access systems. Examples of the various wireless access systems include 3GPP (3rd Generation Partnership Project) system, 3GPP2 system and/or IEEE 802.xx (Institute of Electrical and Electronic Engineers 802) system. The embodiments of the present invention may be applied to all the technical fields based on the various wireless access systems as well as the various wireless access systems.

The invention claimed is:

1. A method for performing a handover to a cellular network in a wireless access system supporting device to device (D2D) direct communication, the method comprising:
    detecting an occurrence of a handover condition to the cellular network for a first device performing the D2D direct communication with a second device;
    transmitting a message for requesting a bandwidth for the cellular network to a base station when the occurrence of the handover condition is detected;
    receiving a bandwidth response message including bandwidth allocation information for allocating the bandwidth to the first device in response to the bandwidth request of the first device from the base station; and
    transmitting data to the second device through the base station and the cellular network based on the bandwidth allocation information,
    wherein the handover condition includes whether a transmission power of the first device is greater than a threshold value.

2. The method according to claim 1, wherein the handover condition further includes one or more of:
    reception of a continuous negative acknowledgement (NACK) signal of two times or more,
    occurrence of a continuous time-out, a case where a channel status of a channel for the D2D direct communication is less than a reference value,
    a case where one of the first and second devices, which are performing the D2D direct communication, moves to another cell,
    a case where a modulation and coding scheme (MCS) level of one of the first and second devices, which are performing the D2D direct communication, is less than a threshold value, a case where channel quality of each of devices, which are performing the D2D direct communication, is less than a threshold value, and
    a case where radio resources to be allocated to the first and second devices, which are performing the D2D direct communication, are not sufficient.

3. The method according to claim 2, further comprising:
    receiving a channel quality information request message for requesting channel quality information from the base station; and
    transmitting a channel quality information response message, which includes the channel quality information, to the base station.

4. The method according to claim 2, further comprising:
transmitting a message, which indicates that the D2D direct communication has ended, to the base station and the second device which is performing the D2D direct communication.

5. The method according to claim 2, further comprising:
receiving a message, which indicates that the D2D direct communication has ended, from the base station.

6. The method according to claim 1, wherein the threshold value is determined based on a transmission power gain obtained by performing the D2D direct communication in comparison with the cellular network.

7. A method for supporting a handover to a cellular network in a wireless access system supporting device to device (D2D) direct communication, the method comprising:
receiving a request message of a bandwidth for the cellular network from a first device, which detects a handover condition to the cellular network has occurred and performs the D2D direct communication with a second device;
allocating a bandwidth to the first device and the second device, which performs the D2D direct communication, in response to the bandwidth request of the first device;
transmitting a bandwidth response message, which includes bandwidth allocation information on the allocated bandwidth, to the first device and the second device; and
receiving data from the first device and the second device through the cellular network based on the bandwidth allocation information,
wherein the handover condition includes whether a transmission power of the first device is greater than a threshold value.

8. The method according to claim 7, wherein the handover condition further includes one or more of:
reception of a continuous negative acknowledgement (NACK) signal of two times or more,
occurrence of a continuous time-out,
a case where a channel status of a channel for the D2D direct communication is less than a reference value,
a case where one of the first and second devices, which are performing the D2D direct communication, moves to another cell,
a case where a distance between the first and second devices, which are performing the D2D direct communication, is more than a predetermined distance,
a case where a modulation and coding scheme (MCS) level of one of the first and second devices, which are performing the D2D direct communication, is less than a threshold value,
a case where channel quality of each of the first and second devices, which are performing the D2D direct communication, is less than a threshold value, and
a case where radio resources to be allocated to the first and second devices, which are performing the D2D direct communication, are not sufficient.

9. The method according to claim 8, further comprising:
receiving a channel quality information request message for requesting channel quality information from the base station; and
transmitting a channel quality information response message, which includes the channel quality information, to the base station.

10. The method according to claim 8, further comprising:
transmitting a message, which indicates that the D2D direct communication has ended, to the base station and the second device which is performing the D2D direct communication.

11. The method according to claim 8, further comprising:
receiving a message, which indicates that the D2D direct communication has ended, from the base station.

12. A first device for performing a handover to a cellular network in a wireless access system supporting device to device (D2D) direct communication, the first device comprising:
a radio frequency (RF) module configured to include a transmitter and a receiver; and
a processor operably connected to the RF module and configured to support the handover,
wherein the processor is configured to:
detect an occurrence of a handover condition to the cellular network for a second device performing the D2D direct communication with a third device,
transmit a message for requesting a bandwidth for the cellular network to a base station when the occurrence of handover condition is detected,
receive a bandwidth response message including bandwidth allocation information for allocating the bandwidth to the first device in response to the bandwidth request of the second device from the base station, and
transmit data to the third device by using the RF module through the base station and the cellular network based on the bandwidth allocation information,
wherein the handover condition includes whether a transmission power of the second device is greater than a threshold value.

13. The first device according to claim 12, wherein the handover condition further includes one or more of:
reception of a continuous negative acknowledgement (HACK) signal of two times or more,
occurrence of a continuous time-out,
a case where a channel status of a channel for the D2D direct communication is less than a reference value,
a case where one of the second and third devices, which are performing the D2D direct communication, moves to another cell,
a case where a distance between the second and third devices, which are performing the D2D direct communication, is more than a predetermined distance,
a case where a modulation and coding scheme (MCS) level of one of the second and third devices, which are performing the D2D direct communication, is less than a threshold value,
a case where channel quality of each of the second and third devices, which are performing the D2D direct communication, is less than a threshold value, and
a case where radio resources to be allocated to the second and third devices, which are performing the D2D direct communication, are not sufficient.

14. The first device according to claim 13, wherein the first device receives a channel quality information request message for requesting channel quality information from the base station, and transmits a channel quality information response message, which includes the channel quality information, to the base station.

15. The first device according to claim 13, wherein the first device transmits a message, which indicates that the D2D direct communication has ended, to the base station and the third device which is performing the D2D direct communication.

16. The first device according to claim 13, wherein the first device receives a message, which indicates that the D2D direct communication has ended, from the base station.

* * * * *